United States Patent [19]
Okada

[11] 4,283,740
[45] Aug. 11, 1981

[54] APPARATUS FOR DISCRIMINATING TELEVISION SIGNAL

[75] Inventor: Masataka Okada, Kounosu, Japan

[73] Assignee: Clarion Co., Ltd., Tokyo, Japan

[21] Appl. No.: 92,401

[22] Filed: Nov. 8, 1979

[30] Foreign Application Priority Data

Nov. 18, 1978 [JP] Japan .................. 53-142687

[51] Int. Cl.³ .................................. H04N 7/16
[52] U.S. Cl. .................................. 358/124; 358/120
[58] Field of Search .......................... 358/124, 120

[56] References Cited
U.S. PATENT DOCUMENTS 3,801,732  4/1974  Reeves ...................... 358/124
4,022,972  5/1977  Pires ........................ 358/124
4,024,574  5/1977  Nieson ....................... 358/117
4,025,948  5/1977  Loshin ....................... 358/122

Primary Examiner—S. C. Buczinski
Attorney, Agent, or Firm—Oblon, Fisher, Spivak, McClelland & Maier

[57] ABSTRACT

A television signal discriminating apparatus adapted for use with the pay television system, which apparatus, for being compatible with the normal television system, monitors the television signal of received electric wave to detect whether it is from the pay television broadcasting station or the normal one and provides the correct video signal in accordance with the mode of modulation thereof.

2 Claims, 2 Drawing Figures

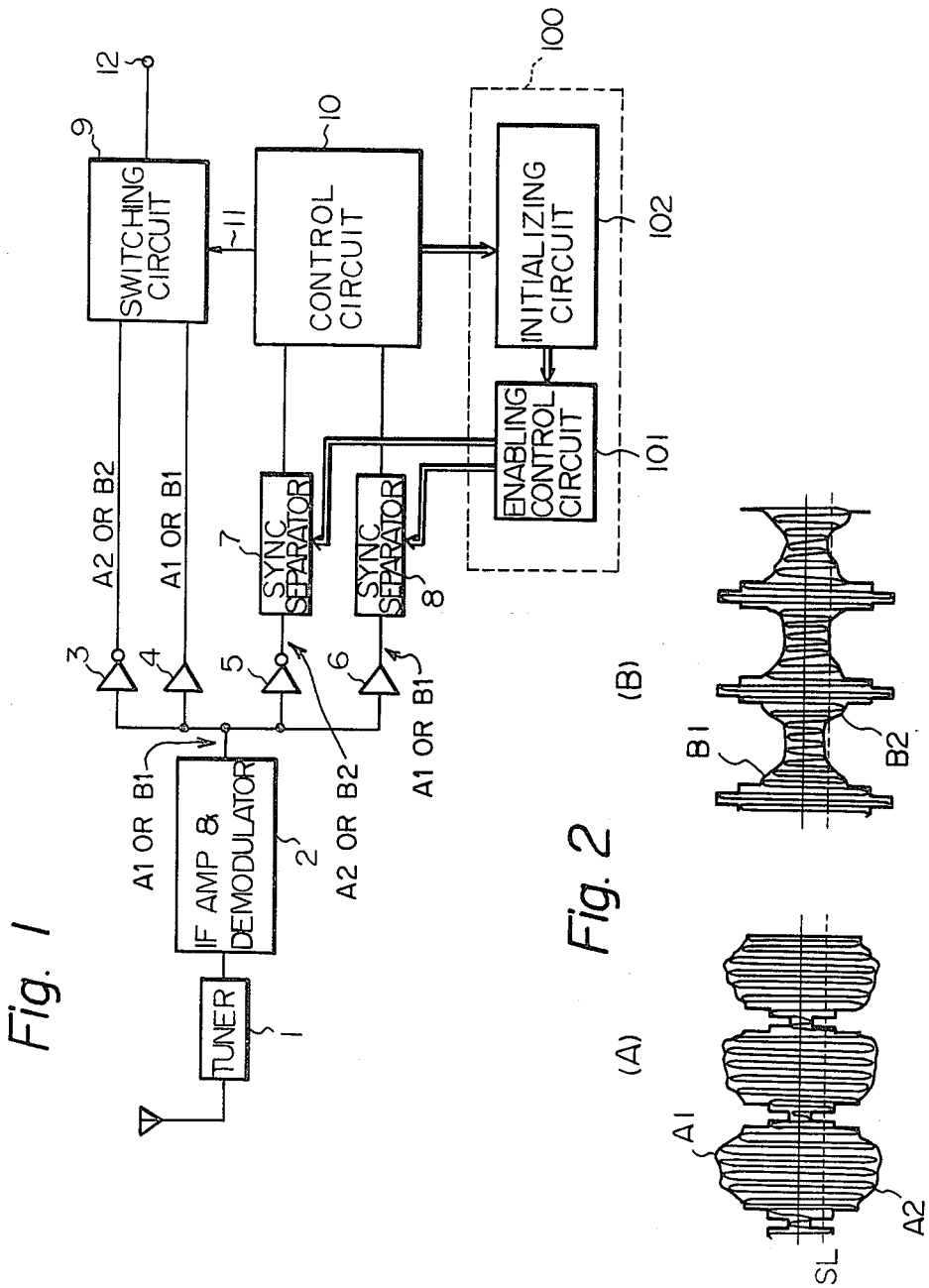

APPARATUS FOR DISCRIMINATING TELEVISION SIGNAL

BACKGROUND OF THE INVENTION

The present invention relates to a discriminating apparatus for television signal including scrambled video signal (scrambled television signal) and, more particularly, to such apparatus adapted for use with a wireless pay television system in which the television signal scrambled by an encoder of the broadcasting station offering a charged sustaining program is reproduced into proper picture and sound in the television receiver of a specified subscriber by means of a decoder attached thereto, said apparatus automatically discriminating between normal television signal and the television signal from said system.

The so-called pay television system was developed in accordance with demands for more substantial and enriched programs even with charges in view of tiresome commercial messages unavoidable in charge-free commercial broadcasting and decline in quality of programs due to various limitations. The wireless pay television system thus developed has advantages such that cost and time for laying cables can be eliminated and theoretically there is no limitation in the number of subscribers to a system unlike cable television system since the system is wireless. Because of these advantages, the wireless pay television system is regarded to have a noticeable future.

Generally, in the wireless pay television system intended exclusively for specified subscribers, video and sound signals are encoded to exclude non-subscribers from receiving the programs.

While the pay television system is intended exclusively for the specified subscribers as mentioned above, it is desirable that the existing ordinary television set can be used commonly for the pay television system also. Accordingly, in such system, a decoder which decodes the encoded signal is prepared for the specified subscribers, by only such decoder being added to the existing ordinary television set, either signal from general television broadcasting and pay television broadcasting is selective. While the television signal of many general television broadcasting is modulated in negative modulation system, one of pay television broadcasting is in positive modulation, the decoder must discriminate automatically to which broadcasting the received signal belongs. This is true also in the case where a mode of modulation is reversed.

FIG. 1 shows a block diagram of an embodiment of the discriminating apparatus for television signal according to the present invention, which includes a novel control means 100 added to a conventional discriminator for encoded television signal. A tuner 1 selects the desirable electric wave out of the received waves and converts it into the IF frequency signal. An IF amplifier and demodulator 2 amplifies and demodulates the output from the tuner 1, the demodulated video signal (television signal) is supplied to a switching circuit 9 through invertors 3 and 4, to a first sync separator through an invertor 5, to a second sync separator through a buffer 6, respectively. When the pay television system adopts the positive modulation system, the received television signal is as shown in FIG. 2(A), on the other hand, in the normal television system adopting the negative modulation system, the received television signal is as shown in FIG. 2(B). Accordingly, after the received signal is demodulated, either envelope curve A1 or B1 in accordance with the mode of modulation of the broadcasting station is supplied to the invertors 3 and 5, the buffers 4 and 6.

On the assumption that the received signal is transmitted from the pay television broadcasting station, the signal applied to the first sync separator 7 through the invertor 5 is as the curve A2 (disregarding DC level) inverting the curve A1. Similarly, the signal applied to the second sync separator 8 is as the curve A1, but it is the same as the curve B2 disregarding DC level. The first and second sync separator function similarly to the conventional sync separator, if the threshold SL for separating is set as shown in FIG. 2, a pulse signal supplied to a control circuit 10 for discrimination of television signal has a uniform pulse width and pulse interval as conjectured from FIG. 2, but the pulse width and interval of a pulse supplied to the control circuit 10 from the second sync separator 8 is ununiformed under the influence of the video signal. The control circuit 10 distinguishes whether the received signal is from the pay television broadcasting station or the normal one by checking the pulse width and interval of the pulse signal provided by the first and the second sync separators 7 and 8, and controls the switching circuit 9 through a control line 11. Then, the control circuit 10 provides the output signal from the invertor 3 as video signal at an output terminal 12 if the received signal is concluded that it is from the pay television broadcasting station, or, on the other hand, when it is judged to be from the normal one the output signal from the buffer 4 is supplied to the output terminal 12 as video signal.

In the prior art, since the discrimination is made as mentioned above and is made continuously, the control circuit 10 sometimes malfunctions due to noise or specified kind of video signal.

SUMMARY OF THE INVENTION

Accordingly, an object of the present invention is to provide a discriminating apparatus for television signal which discriminates between television signals of different modes and enables to supply the stable video signal.

BRIEF DESCRIPTION OF THE DRAWINGS

FIG. 1 is a block diagram of an embodiment of the television signal discriminating apparatus according to the present invention; and FIG. 2 is a diagram showing the samples of wave shape of television signal.

DESCRIPTION OF THE PREFERRED EMBODIMENT

The preferred embodiments of the present invention will now be described in detail with reference to the drawings.

As shown in FIG. 1, the discriminating apparatus according to the present invention includes a control means 100 comprising an enabling control circuit 101 and an initializing circuit 102, adding to the conventional discriminating apparatus, whereby the automatic discrimination is made correctly. As described above, the signal transmitted from the broadcasting station is provided through the tuner 1 to the IF amplifier and demodulator 2, which supplies with the demodulated output to the invertors 3, 5 and the buffers 4, 6. Furthermore, the first and the second sync separators provide with the pulse signal in accordance with the predetermined threshold level to the television signal discriminating control circuit 10, which, judging from the timing of said pulse signal, determines that the received electric wave is from the pay television broadcasting station or the normal one, and drives the switching circuit 9 accordingly to this determination to provide with the demodulated signal selected by that determination to the output terminal 12 as video signal.

Here, the control circuit 10 functions so as to determine the television signal by the pay television broadcasting, that is, the output of the first sync separator 7 in priority to the output of the second sync separator 8. When the checking of the output of the first sync separator 7 did not result in the determination as a proper signal, the control circuit 10 initiates the determination for the output of the second sync separator 8.

In the case where the received television signal is from the normal television broadcasting station, when the control circuit 10 determines as that the initializing circuit 102 functions so as to inhibit the first sync separator 7 through the enabling control circuit 101 in response to the control circuit 10. This inhibition prevents the control circuit 10 from momentarily causing the switching circuit 9 to provide an incorrect television signal due to the noise such as an impulse and the like in the prior art. The effect of this inhibiting operation is perfect if the first sync separator is shorted completely, but the control circuit should follow the change when the received electric wave from the normal television broadcasting station is changed to that from the pay television broadcasting station. In the preferred embodiments of the present invention, providing the sync separator with a low-impedance by switching transistor included in the enabling control circuit 101 whereby the sync separator is set in a half-enabling state and the control circuit 10 can detect the arrival of the correct television signal from the pay television broadcasting station.

In the case where the received television signal is from the pay television broadcasting station, the control circuit 10 does not respond to the signal from the second sync separator due to the single-shot noise and the like because of the prior operation described above. Furthermore, the initializing circuit 102 acts on the control circuit 10 so that the check for the pay television broadcasting is initially made at the initial state such as the throwing of power. Although the enabling control circuit 101 does not act on the second sync separator 8 to set in the half-enabling state, controls the threshold level and the like so as to carry out the stable separation of the synchronizing signal.

Accordingly, while in the prior art, since the television signal discriminating control circuit 10 monitored two outputs of the sync separators equally, the apparatus can malfunction due to the single-shot noises, according to the present invention, the half-enabling state is set up at the first sync separator 7 and two sync separators are weighted in accordance with the condition thereof by compulsorily initializing, whereby the stable output of the video signal is obtainable without the malfunctions due to the noises and some kinds of shape of video signal. Furthermore, the present invention is adaptable when the modes of modulation system in the pay television broadcasting and the normal one are reverse mutually.

While we have shown and described specific embodiments of our invention, it will be understood that these embodiments are merely for the purpose of illustration and description and that various other forms may be devised within the scope of our invention, as defined in the appended claims.

I claim:

1. In an apparatus for discriminating a television signal for use in a pay television system in which a scrambled television signal is transmitted from a broadcasting station and specified subscribers view by restoring the received scrambled television signal, said apparatus comprising a first sync separator connected to an output of a demodulator, a second sync separator connected to said output of said demodulator through an invertor, and a television signal discriminating control circuit means coupled to said first and second sync separators for determining whether the received television signal is from one of a pay television broadcasting station and a normal television broadcasting station in accordance with output signals from said first and second sync separators and for supplying restored television signals to a television receiver, wherein the improvement comprises:

enabling control circuit means coupled to said first and second sync separators for controlling the outputs of said first and second sync separators and for controlling the input impedance of said first sync separator; and initializing circuit means coupled between said signal discriminating control circuit means and said enabling control circuit means for controlling said enabling control circuit means;

wherein said enabling control circuit means initially supplies an output from said first sync separator to said signal discriminating control circuit means; and wherein, if said signal discriminating control circuit means is not satisfied with said output from said first sync separator, said enabling control circuit means supplies an output from said second sync separator to said signal discriminating circuit means, and said enabling control circuit means changes the input impedance of said first sync separator so as to place said first sync separator in a half-enabling state.

2. The apparatus as recited in claim 1 wherein said second sync separator is the sync separator for the pay television broadcasting.

* * * * *